Patented Jan. 19, 1932

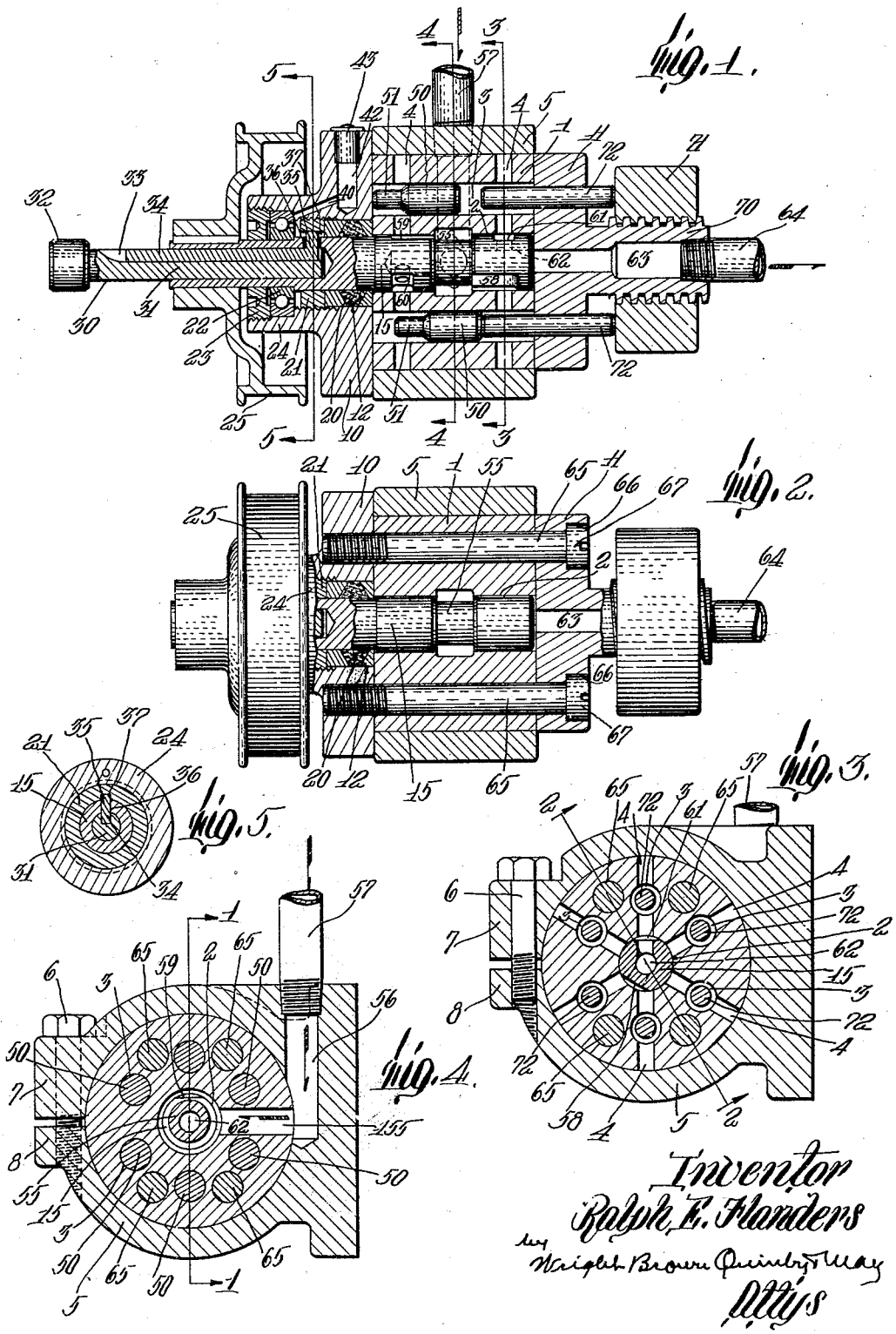

1,841,526

UNITED STATES PATENT OFFICE

RALPH E. FLANDERS, OF SPRINGFIELD, VERMONT, ASSIGNOR TO JONES & LAMSON MACHINE COMPANY, OF SPRINGFIELD, VERMONT, A CORPORATION OF VERMONT

METERING DEVICE

Application filed October 10, 1929. Serial No. 398,693.

This invention relates to devices for regulating the flow of liquid and while not restricted to such use has been more particularly intended for use in connection with a fluid operated mechanism, such, for example, as for imparting reciprocations to the tool carrying slide of a machine tool, such a mechanism being shown in the Hartness Patents No. 637,461 and No. 739,866 to control the feeding speed of the tool.

One object of this invention is to produce a metering device in which the flow of fluid is more uniform than in prior constructions for this purpose so that a steady feed motion is imparted to the tool without the use of accumulating mechanism to smooth out momentary variations in fluid flow.

A further object is to improve the construction of such devices for ease of manufacture and assembly and accessibility of the parts.

For a more complete understanding of this invention, together with further objects and advantages, reference may be had to the accompanying drawings in which Figure 1 is a central longitudinal section through one form of the device on line 1—1 of Figure 4.

Figure 2 is a view partly in section and partly in side elevation of the same.

Figures 3, 4 and 5 are sections on the correspondingly marked section lines on Figure 1.

As shown in these figures the device comprises a block 1 of substantially cylindrical form having a central axial bore 2 and a series of passages 3 arranged in circular array about the central bore and in parallel relation thereto. The block is provided also with substantially radial perforations 4, which act to connect opposite end portions of the passages 3 with the central bore 2.

The block 1 is surrounded by a casing 5 which serves to close off the outer ends of the perforations 4, this casing, as shown in Figures 3 and 4, being formed split so that it may be clamped tightly about the block 1 as by means of one or more clamping bolts 6 which pass through a lug 7 at one extremity of the split portion and are threaded into a lug 8 opposite thereto in the other extremity. Opposite ends of the block are bridged over by end plates 10 and 11, closing off the ends of the passages 3. One of these end plates as 10 has an axial opening 12 through which extends a rotary valve member 15 which is rotatable within the central bore 2 of the block 1. At 20 is shown a packing gland to make a fluid tight rotary bearing between the plate 10 and the valve 15 and outwardly of this packing portion is shown positioned a gland nut 21 externally threaded to engage in a mated threaded portion of the opening 12. Outwardly of this nut is shown positioned a suitable ball bearing 22 which is retained in position by means of a threaded plug 23 inserted in the outer end of the central hub portion 24 of the end plate 10. At 40 is shown an oil hole leading to the ball bearing 22 from an oil reservoir 42 normally closed by a cap 43. The valve member 15 extends outwardly of the hub portion 20 and carries fixed thereto a belt pulley 25.

In order that the gland nut 21 may be adjusted readily the outer end portion of the valve member 15 is shown as hollow and may receive therein a suitable tool 30 in engagement with the gland nut and by which this gland nut may be rotated as desired. This tool as shown comprises a shank portion 31 having a head 32 at its outer end by which it may be turned, the shank portion having a longitudinally extending slot or keyway 33 therein for the slidable reception of a key member 34. This key member has an outwardly turned inner end as 35 adapted to be projected through a slot 36 in the side wall of the valve member 15 and engage in a notch 37 in the inner wall of the gland nut 21. The gland nut may thus be locked to the valve member 15 so that by turning the pulley 25 in the proper direction the member may be tightened or loosened as desired. The tool is then removed from the device and this may be done by first pulling out the shank member 30, whereupon the key 34 may be moved laterally to bring its end 35 within the bore of the valve member so that it may be removed through this bore.

Within each of the passages 3 is slidably positioned a piston 50 and as shown each of these pistons has an end extension 51 of reduced diameter which may abut against the end plate 10 and yet permit the flow of fluid through the perforations 51 adjacent to the end plate 10 from and to the interior of the chamber formed by each of these passages at that end of the piston, each of the pistons serving as a movable partition separating opposite ends of the corresponding passage into a pair of chambers into and out of which the liquid may pass as controlled by rotation of the valve member 15. To this end the valve member 15 is provided with a central portion 55 of reduced diameter and the bore 2 may be enlarged opposite thereto also, if desired, to furnish a passage with which communicates a fluid intake port 155, which as shown in Figure 4, extends laterally through the block 1 and communicates with a port 56 in the casing 5 leading from the intake pipe 57. The valve 15 also has at each end of the reduced diameter portion 55 a series of cut away portions 58 and 59 (see Figures 1, 3 and 4) which act as ports leading from the supply passage about the center of the valve toward opposite ends of the block 2 and which are adapted to open communication successively with the perforations 4 as the valve is rotated. Substantially oppositely disposed to the ports 58 and 59 but at opposite ends of the central supply passage the valve member 15 is provided with the flattened portions 60 and 61 which lead through radial ports in the valve to a centrally disposed axially arranged exhaust passage 62. This exhaust passage opens through the end of the valve opposite to the belt pulley and into an exhaust passage 63 in the end plate 11 with which an exhaust pipe 64 communicates. As shown the two end plates are clamped against the end faces of the block 1 as by means of screws 65, which are shown as threaded into the end plate 10 and pass through the block 1 and the end plate 11, the end plate 11 as shown having countersunk openings 66 therein to receive the heads 67 of these screws.

As the rotary valve 15 is turned by rotation imparted to the belt pulley 25 communication is successively opened from the supply passage to the chambers at opposite ends of the pistons, the communications being arranged to occur successively to the several chambers at opposite ends of the pistons in series, and when communication is open to the chamber at one end of each piston, the corresponding chamber at the other end of this piston is opened to the exhaust. As shown the supply and exhaust ports at opposite ends of the valve member 15 are disposed slightly away from diametrical opposition so that when an inlet port is fully open leading to a chamber at one side of a piston, the inlet port is opening or closing in the chamber at the other end of another piston, the respective exhaust ports being correspondingly arranged thus to tend to equalize and smooth out the flow of liquid through the device throughout all angular positions of the valve member. Thus with the six passages 3 shown, forming 12 chambers, there are twelve single impulses instead of six double impulses for each revolution of the valve 15, the chambers being opened to fluid pressure successively rather than in pairs.

Means are also provided by which the rate of flow for any given speed of rotation may be adjusted within a considerable range. To this end the end plate 11 is shown as provided with a hub extension 70 externally threaded and upon which engages an adjusting nut 71. Against the inner face of this adjusting nut bear adjusting plungers 72 each of a somewhat smaller diameter than the passages 3 so as not to stop flow through the perforations 4 into or out therefrom, these plungers 72 extending into the passages and forming abutments to limit the extent of travel of the pistons. By this means the effective volume of each of the chambers is adjusted simultaneously, the longer the stroke permitted to the piston, the larger being the volume of displacement and the greater the capacity of each chamber to receive liquid, and thus the greater the capacity of the device to pass liquid therethrough for any given speed of rotation of the pulley 25.

An embodiment of this invention having thus been described it should be evident to those skilled in the art that various changes and modifications might be made therein without departing from its spirit or scope as defined by the appended claims.

I claim:

1. A device of the class described comprising a block having a central bore and a series of passages in substantially circular array about said bore and each communicating adjacent to opposite ends therewith, said block having fluid intake and exhaust openings, a piston in each passage closing off communication between opposite ends thereof, and a rotary valve in said central bore having ports positioned to connect said intake ports serially to one end of each passage and the opposite end of the same passage to the exhaust and alternately to opposite ends of each passage.

2. A device of the class described comprising a block having a central bore and a series of passages in substantially circular array about said bore and each communicating adjacent to opposite ends therewith, said block having fluid intake and exhaust openings, a piston in each passage closing off communication between opposite ends thereof, a rotary valve in said central bore having ports positioned to connect said intake ports serially to one end of each passage and the opposite end of the same passage to the exhaust and alternately to opposite ends of each passage, and means for limiting the amplitude of stroke of said pistons to regulate the volume of displacement of each piston stroke.

3. A device of the class described comprising a block having a central bore therethrough and a series of passages substantially parallel to said bore in circular array therearound, cover plates covering the ends of said block and closing off said passages at their ends, an opening therethrough, a rotary valve positioned within said bore and having an end portion extending through said opening, a piston slidable in each of said passages dividing its passage into a pair of chambers each of a capacity variable with the position of said piston, said block having a port leading to the central portion of said bore, and said other cover plate having a port communicating with said bore, said valve having ports for successively opening communication from said block and cover plate ports to said chambers as said valve is rotated, and means outwardly of said one cover plate for rotating said valve.

4. A device of the class described comprising a block having a central bore therethrough and a series of passages substantially parallel to said bore in circular array therearound, cover plates covering the ends of said block and closing off said passages at their ends, a rotary valve positioned within said bore, a piston slidable in each of said passages dividing its passage into a pair of chambers each of a capacity variable with the position of said piston, said block having a port leading to the central portion of said bore, and said other cover plate having a port communicating with said bore, said valve having ports for successively opening communication from said block and cover plate ports to said chambers as said valve is rotated, and means for rotating said valve, stop pins projecting through one of said cover plates and into said passages, and a member adjustable axially of said bore and bearing on said pins to adjustably determine the amplitude of stroke of said pistons.

5. A device of the class described comprising a block having a central bore therethrough and a series of passages substantially parallel to said bore in circular array therearound, said block having radial perforations from its outer faces joining such passages with said bore, cover plates covering the ends of said block and closing off said passages at their ends, a rotary valve positioned within said bore, a piston slidable in each of said passages dividing its passage into a pair of chambers each of a capacity variable with the position of said piston, said block having a port leading to the central portion of said bore, and one of said cover plates having a port communicating with said bore, said valve having ports for successive cooperation with said perforations as said valve is rotated to open communication alternately between said block and cover plate ports with such chambers in succession, and a casing about said block closing off the outer ends of said perforations.

6. A device of the class described comprising a block having a valve bore, a rotary valve in said bore, means closing off one end of said bore and having an opening through which said valve extends, a packing in said opening about said valve, a gland nut for said packing, and removable key means for locking said nut to said valve whereby turning of said valve adjusts said nut.

7. A device of the class described comprising a block having a bore, a rotary member in said bore, means closing off one end of said bore and having an opening through which said member extends, a packing in said opening about said member, a gland nut for said packing, said member having an axial bore and an opening from said bore through the side of said member at said gland nut, said gland nut having an internal keyway, and a key insertable through said bore and said opening into said keyway for locking said member to said gland nut, whereby turning of said member adjusts said nut.

8. A device of the class described comprising a block having a bore, a rotary member in said bore, means closing off one end of said bore and having an opening through which said member extends, a packing in said opening about said member, a gland nut for said packing, said member having an axial bore and an opening from said bore through the side of said member at said gland nut, said gland nut having an internal keyway, and a key insertable through said bore and having a lateral extension projectable through said opening into said keyway and a removable member insertable in said bore for holding said key extension in said opening to maintain said member keyed to said gland nut whereby rotation of said member adjusts said nut.

9. A device of the class described comprising a block having a central bore therethrough and a series of passages substantially parallel to said bore in circular array therearound and communicating adjacent to opposite ends therewith, said block having fluid intake and exhaust passages, a piston in each passage closing off communication between opposite ends thereof, and a rotary valve in said central bore having ports positioned to connect said intake serially to one end of each passage and the opposite end of the same passage to the exhaust and alternately to opposite ends of each passage, the times of full port opening at opposite ends of each block being different thereby to open communication with said fluid under pressure to one end of one passage before closing communication to the other end of another passage, thereby to smooth out the flow of liquid through the device for all angular positions of said valve.

In testimony whereof I have affixed my signature.

RALPH E. FLANDERS.